(12) United States Patent
Shioya et al.

(10) Patent No.: US 6,682,588 B2
(45) Date of Patent: Jan. 27, 2004

(54) INK-JET INK, METHOD FOR ALLEVIATING KOGATION ON SURFACE OF HEATER OF INK-JET RECORDING HEAD, METHOD FOR INK-JET RECORDING, INK-JET RECORDING APPARATUS, RECORDING UNIT AND METHOD FOR PROLONGING INK-JET RECORDING HEAD LIFE

(75) Inventors: Makoto Shioya, Kawasaki (JP); Ryuji Katsuragi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 09/783,555

(22) Filed: Feb. 15, 2001

(65) Prior Publication Data

US 2002/0029722 A1 Mar. 14, 2002

(30) Foreign Application Priority Data

| Feb. 17, 2000 | (JP) | .......................................... | 2000-045075 |
| Apr. 26, 2000 | (JP) | .......................................... | 2000-125481 |
| Apr. 26, 2000 | (JP) | .......................................... | 2000-125482 |

(51) Int. Cl.⁷ .............................................. C09Z 11/02
(52) U.S. Cl. ................................ 106/31.43; 106/31.75; 106/31.36; 106/31.68
(58) Field of Search .......................... 106/31.43, 31.75, 106/31.36, 31.68

(56) References Cited

U.S. PATENT DOCUMENTS

| 5,062,892 A | | 11/1991 | Halko ........................ 106/31.58 |
| 5,221,330 A | * | 6/1993 | Matsumoto et al. ......... 101/451 |
| 5,443,628 A | * | 8/1995 | Loria et al. ............... 106/31.65 |
| 5,451,251 A | | 9/1995 | Mafune et al. ........... 106/31.48 |
| 5,472,490 A | * | 12/1995 | Sawamura et al. ......... 106/410 |
| 5,609,671 A | | 3/1997 | Nagasawa ................. 106/31.65 |
| 5,730,789 A | * | 3/1998 | Botros ...................... 106/31.27 |
| 5,746,818 A | * | 5/1998 | Yatake ..................... 106/31.28 |
| 5,925,176 A | * | 7/1999 | Rehman ................... 106/31.43 |
| 6,280,512 B1 | * | 8/2001 | Botros ...................... 106/31.43 |
| 6,319,309 B1 | * | 11/2001 | Lavery et al. ........... 106/31.27 |
| 6,383,275 B1 | * | 5/2002 | Lin .......................... 106/31.27 |

FOREIGN PATENT DOCUMENTS

| JP | 54-51837 | 4/1979 |
| JP | 3-160070 | 7/1991 |
| JP | 5-186704 | 7/1993 |
| JP | 8-3498 | 1/1996 |

* cited by examiner

Primary Examiner—Mark L. Bell
Assistant Examiner—Veronica F. Faison
(74) Attorney, Agent, or Firm—Fitzpatrick, Cella, Harper & Scinto

(57) ABSTRACT

An ink for ink-jet recording which comprises (a) a coloring material, (b) a liquid medium, and (c) an ammonium salt of an acid having a methyl or methylene group and a carboxylic group, or an ammonium aldonate, or an ammonium salt of citric acid, to alleviate kogation of the ink-jet head heater having an outermost protecting layer containing at least one of a metal and a metal oxide.

14 Claims, 3 Drawing Sheets

INK-JET INK, METHOD FOR ALLEVIATING KOGATION ON SURFACE OF HEATER OF INK-JET RECORDING HEAD, METHOD FOR INK-JET RECORDING, INK-JET RECORDING APPARATUS, RECORDING UNIT AND METHOD FOR PROLONGING INK-JET RECORDING HEAD LIFE

BACKGROUND OF THE INVENTION

1. Field of the Invention

This invention relates to an ink-jet ink, a method for decreasing kogation on the surface of a heater for heat application to the ink, a method for ink-jet recording, an ink-jet recording apparatus, a recording unit, and a method for increasing life of the ink-jet recording head.

2. Related Background Art

There have been proposed various types of ink-jet recording methods. According to one ink-jet recording method, the so-called bubble-jet recording method described in, for example, Japanese Patent Application Laid-Open No. 54-51837, ink is ejected in the form of ink droplets by the action of thermal energy. This ink-jet method has a feature that high quality images can be formed on plain paper having no special coating layer at high speed and at low cost, due to the very simple structure of the high-density multi-nozzles. In this method, rapid heating of the heater in the recording head induce bubble generation in the liquid on the heater with rapid bubble volume inflation, and the action force due to this rapid volume increment ejects a liquid droplet from the nozzles arranged at the tip of the recording head to make the droplet fly to the recording material and attach thereon. Printing is thus carried out.

In this method, however, the heater in the recording head is repeatedly heated to eject ink during mass printing. This may cause the deposition of the decomposition product of the ink, so-called koga (scorch), on the surface of the heater. Deposition of koga prevents the efficient transmission of the thermal energy from the heater to the ink, resulting in the decrease in the volume and speed of the ejected droplets in comparison with the initial stage, which affects the image quality. In such a case, the recording head must be changed with a new one in order to continuously achieve high quality printing. To the users, this means a higher printing cost in total.

Thus, further reduction of kogation on the heater in order to prolong the recording head life has been one of the important technical problems to be improved in the art of bubble-jet method. There has been proposed, for example, ink containing an oxoanion (Japanese Patent Application Laid-Open No. 3-160070), where as an oxoanion, described are phosphate salts, polyphosphates, phosphate esters, arsenates, molybdates, sulfates, sulfites and oxalates.

However, when the ejection of such an ink is repeated, the oxoanions in the ink dissolve the outermost protection layer of the heater, which layer is comprised of a metal or a metal oxide or both such as tantalum. In addition, such an ink is still insufficient in kogation prevention.

SUMMARY OF THE INVENTION

An object of the present invention is to provide a method for decreasing kogation on the surface of the heater which is used for applying thermal energy to the ink in a recording head so as to eject the above ink from the recording head.

Another object of the present invention is to provide an ink-jet recording apparatus which enables high quality printing and prolonged product life of the recording head.

A further object of the present invention is to provide a recording unit which enables high quality printing over a prolonged period.

Still another object of the present invention is to provide a method for prolonging the product life of the recording head to lower the cost in high quality printing.

According to one aspect of the present invention, an ink for ink-jet recording comprises:

(a) a coloring material, (b) a liquid medium, and (c) an ammonium salt of an acid having a methyl or methylene group and a carboxylic group.

According to another aspect of the present invention, an ink for ink-jet recording comprises:

(a) a coloring material, (b) a liquid medium, and (c) an ammonium aldonate.

According to still another aspect of the present invention, an ink for ink jet recording comprises:

(a) a coloring material, (b) a liquid medium, and (c) at least one or more compounds selected from the group consisting of monoammonium citrate, diammonium citrate, and triammonium citrate.

According to still another aspect of the present invention, a method alleviates kogation on a surface of a heater of a recording head of an ink-jet printer, the heater being arranged to apply thermal energy to an ink in the recording head to eject the ink from an orifice in the recording head, wherein the heater has an outermost protection layer containing at least one of a metal and a metal oxide, and the ink is one of the above-mentioned inks.

According to further aspects of the present invention, an ink-jet recording method and an ink-jet recording apparatus are provided in which the ink used therein is one of the above-mentioned inks.

When one of the above-mentioned inks is used in an ink jet recording apparatus where ink is ejected as an ink droplet by the action of thermal energy applied from the heater, kogation on the outermost surface of the heater is very effectively reduced. The mechanism of the kogation alleviation is unclear, but it is considered that the component (c) of the ink of the invention interacts with the metal and/or the metal oxide constituting the outermost protection layer of the heater to prevent koga deposition or to enhance the decomposition of koga or peeling off of koga from the surface.

Further studies of the inventors have revealed that the effect of the ink of the invention becomes more eminent when the metal and/or metal oxide contained in the protecting layer of the heater is tantalum or tantalum oxide. Further the energy amount applied to the heater can be controlled in relation to the minimal energy required for ink ejection to improve the kogation alleviation effect of the present invention without disconnection of the heater with excellent ejection durability.

DETAILED DESCRIPTION OF THE PREFERRED EMBODIMENTS

Figure 1:
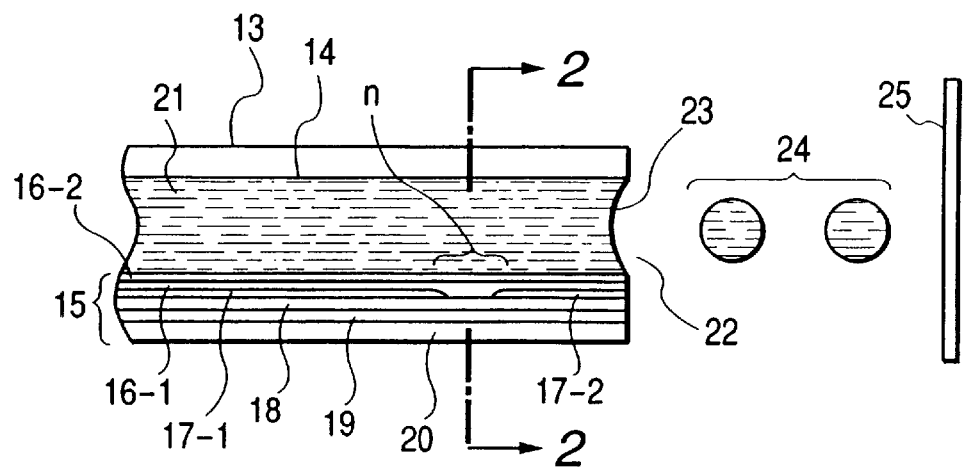
FIG. 1 is a vertical sectional view of one example head of an ink-jet recording apparatus.

The present invention will be described in further detail with reference to the preferred embodiments.

<First Embodiment>

First, inks of one embodiment of the invention are described. Such an ink comprises (a) a coloring material, (b) a liquid medium, and (c) at least one compound selected from the group consisting of the ammonium salt of an acid having methyl or methylene group and a carboxyl group. Each ink component is described as follows.

Component (c): Ammonium Salt of an Acid Having a Methyl or Methylene Group and a Carboxylic Group One of the features of the ink of the present invention is this component. The inventors of the present invention studied intensively a method for decreasing koga on the surface of a heater provided in an ink-jet recording head for the ink-jet recording in which ink is ejected as ink droplets by the action of thermal energy, and they have found that such kogation is very effectively reduced when the ink contains at least one of the ammonium salts of acids having a methyl or methylene group and a carboxylic acid. This finding led to the present invention. In addition, it was found that by using the ink of the present invention for ink-jet printing, the disconnection of the heater in the recording head is prevented and the ejection durability is enhanced to a large extent.

It is preferred that such an ammonium salt would not visually affect the tone of the ink. For this purpose, acids having not more than 10 carbon atoms and 3–6 oxygen atoms are preferably used. For example, ammonium salts of malonic acid, succinic acid, glutaric acid, adipic acid, lactic acid, malic acid, aspartic acid, and glutamic acids can be used.

These ammonium salts can be used singly, or in combination of two or more. The total content of at least one compound selected from the above defined ammonium salts is 0.005–20 wt % of the total ink weight, preferably, 0.05–15 wt % of the total amount of the ink, when the sufficient reduction of kogation and applicability for ink-jet printing such as little recording head clogging are considered.

<Second Embodiment>

Next, the ink of the second embodiment of the invention is described. The ink comprises (a) a coloring material, (b) a liquid medium, and (c) an aldonic acid ammonium salt.

Aldonic Acid Ammonium Salt

One of the features of the ink of the present invention is this ammonium aldonate. Aldonic acid is a polyoxycarboxylic acid obtainable by oxidizing the aldehyde group of an aldose into a carboxyl group and has the following general formula:

$$HOOC(C^*HOH)_nCH_2OH$$

wherein n is an integer of 0 or more and C* represents an asymmetric carbon atom.

There exist many optical isomers of an aldonic acid, if the aldonic acid has one or more asymmetric carbon atoms, as shown in the above general formula. Aldonic acids having 5 or more carbons (n=3 or more in the above general formula) rarely exist in an aqueous solution by themselves. Part of the aldonic acid forms a lactone ring with the hydroxy group at the gamma- or delta position, to exist as a three-membered equilibrium mixture of aldonic acid, gamma-aldonolactone and delta-aldonolactone. In general, aldonic acids having 4 carbons (n=2 in the above general formula) also rarely exist by themselves in an aqueous solution, but part of the aldonic acid forms a lactone ring with OH at the gamma position, existing as an equilibrium mixture of aldonic acid and gamma-aldonolactone.

Aldonic acids are classified according to the carbon number; i.e. those having 4 carbons (n=2 in the above general formula), i.e., tetronic acids, those having 5 carbons (n=3 in the above general formula), i.e., pentonic acids, and those having 6 carbons (n=4 in the above general formula), i.e., hexonic acids (hexosaccharic acid). Aldonic acid is exemplified by, for example, glycolic acid (hydroxyacetic acid) having 2 carbons (n=0 in the above general formula), glyceric acid having 3 carbons (n=1 in the above general formula); erythronic acid and threonic acid having 4 carbons (n=2 in the above general formula); xylonic acid, ribonic acid, arabonic acid and lyxonic acid having 5 carbons (n=3 in the above general formula); gluconic acid, allonic acid, altronic acid, mannonic acid, glonic acid, idonic acid, galactonic acid and talonic acid having 6 carbons (n=4 in the above general formula); and glucoheptonic acid having 7 carbons (n=5 in the above formula). Each has D-form, L-form and DL-form.

Now gluconic acid is described, which is the most preferable aldonic acid used in the present invention. Gluconic acid is widely used as a food additive, and safe for the human body. Gluconic acid rarely exists in an aqueous solution by itself. Gluconic acid partly forms a lactone ring with the hydroxy group at gamma- or delta position, and exists as a three-membered equilibrium mixture of gluconic acid, gamma-gluconolactone and delta-gluconolactone. Gluconic acid has D-form, L-form, and DL-form, and any of them is applicable. However, its D-form, that is, D-gluconic acid is readily available. Optical isomers of gluconic acid such as aronic acid, altronic acid mannonic acid, glonic acid, idonic acid, galactonic acid, and talonic acid, those having similar properties, can be also used.

In this embodiment, ammonium salts of above aldonic acids can be used. The total content of ammonium aldonate is 0.005–20 wt % of the total ink weight, preferably, 0.05–12 wt % of the total amount of the ink, when the sufficient reduction of kogation and applicability for ink-jet printing such as reduced recording head clogging are considered.

<Third Embodiment>

Next, inks of the third embodiment of the invention are described. Such an ink comprises (a) a coloring material, (b) a liquid medium, and (c) at least one compound selected from the group consisting of ammonium dihydrogen citrate, diammonium hydrogen citrate and triammonium citrate.

Ammonium Dihydrogen Citrate, Diammonium Hydrogen Citrate and Triammonium Citrate One of the features of the ink of the present invention is this component (c). The inventors of the present invention studied intensively a method for decreasing koga on the surface of a heater provided in an ink-jet recording head for the ink-jet recording in which ink is ejected as ink droplets by the action of thermal energy, and they have found that kogation is very effectively alleviated when the ink contains at least one of the ammonium salts of citric acid. This finding led to the present invention. In addition, it was found that by using the ink of the present invention for ink-jet printing, the disconnection of the heater in the recording head is prevented and the ejection durability is enhanced to a large extent.

These ammonium salts of citric acid can be used singly, or in combination of two or more. The total content of at least one compound selected from the above defined ammonium salts is 0.005–20 wt % of the total ink weight, preferably, 0.05–15 wt % of the total amount of the ink, considering the sufficient reduction of kogation and applicability for ink-jet printing such as little recording head clogging.

Next, components (a) and (b) which are common components of the inks of the first to third embodiments.

(a) Coloring Material

As a coloring material, dyes or pigments are preferably used.

Dye

The dyes applicable to the invention include any kinds of dyes, such as direct dyes, acid dyes, basic dyes and disperse dyes. Specifically, following dyes can be used alone or in combination, not limiting to them.

C.I. DIRECT BLACK -4, -9, -11, -17, -19, -22, 32, -80, -151, -154, -168, -171, -194, -195,

C.I. DIRECT BLUE -1, -2, -6, -8, -22, -34, -70, -71, -76, -78, -86, -142, -199, -200, -201, -202, -203, -207, -218, -236, -287,

C.I. DIRECT RED -1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -225, -227,

C.I. DIRECT YELLOW -1, -2, -4, -8, -11, -12, -26, -27, -28, -33, -34, -41, -44, -48, -86, -87, -88, -132, -135, -142, -144,

C.I. FOOD BLACK -1, -2,

C.I. ACID BLACK -1, -2, -7, -16, -24, -26, -28, -31, -48, -52, -63, -107, -112, -118, -119, -121, -172, -194, -208,

C.I. ACID BLUE -1, -7, -9, -15, -22, -23, -27, -29, -40, -43, -55, -59, -62, -78, -80, -81, -90, -102, -104, -111, -185, -254,

C.I. ACID RED -1, -4, -8, -13, -14, -15, -18, -21, -26, -35, -37, -52, -249, -257, -289,

C.I. ACID YELLOW -1, -3, -4, -7, -11, -12, -13, -14, -19, -23, -25, -34, -38, -41, -42, -44, -53, -55, -61, -71, -76, -79,

C.I. REACTIVE BLUE -1, -2, -3, -4, -5, -7, -8, -9, -13, -14, -15, -17, -18, -19, -20, -21, -25, -26, -27, -28, -29, -31, -32, -33, -34, -37, -38, -39, -40, -41, -43, -44, -46,

C.I. REACTIVE RED -1, -2, -3, -4, -5, -6, -7, -8, -11, -12, -13, -15, -16, -17, -19, -20, -21, -22, -23, -24, -28, -29, -31, -32, -33, -34, -35, -36, -37, -38, -39, -40, -41, -42, -43, -45, -46, -49, -50, -58, -59, -63, -64, -180

C.I. REACTIVE YELLOW -1, -2, -3, -4, -6, -7, -11, -12, -13, -14, -15, -16, -17, -18, -22, -23, -24, -25, -26, -27, -37, -42,

C.I. REACTIVE BLACK -1, -3, -4, -5, -6, -8, -9, -10, -12, -13, -14, -18,

PROJET FAST CYAN 2 (available from Zeneca), PROJET FAST MAGENTA 2 (Zeneca), PROJET FAST YELLOW 2 (Zeneca), PROJET FAST BLACK 2 (Zeneca), etc.

Pigment

Pigments applicable to the present invention include any kinds of pigments, such as inorganic pigments and organic pigments.

In particular, the applicable pigments are as follows, but not limited to them.

CARBON BLACK

C.I. PIGMENT YELLOW -1, -2, -3, -12, -13, -14, -16, -17, -73, -74, -75, -83, -93, -95, -97, -98, -114, -128, -129, -151, -154, -195,

C.I. PIGMENT RED -5, -7, -12, -48 (Ca), -48 (Mn), -57 (Ca), -57:1, 57 (Sr), 112, 122, 123, 168, 184, 202,

C.I. PIGMENT BLUE -1, -2, -3, -15:3, -15:34, -16, -22, -60,

C.I. VAT BLUE -4, -6, etc.

(Dispersant)

When the above pigments are used, it is preferable to use a dispersant to stably disperse the pigments in ink. The dispersants applicable to the present invention include polymer dispersants and surfactant-based dispersants. Specific examples of polymeric dispersants are salts of polyacrylate, salts of styrene-acrylic acid copolymer, salts of styrene-methacrylic acid copolymer, salts of styrene-acrylic acid-acrylic ester copolymer, salts of styrene-maleic acid copolymer, salts of acrylic ester-maleic acid copolymer, salts of styrene-methacrylicsulfonic acid copolymer, salts of vinylnaphthalene-maleic acid copolymer, salts of β-naphthalenesulfonic acid formalin condensation product, poly(vinylpyrrolidone), polyethylene glycol and poly(vinyl alcohol). Preferably the weight average molecular weight of the polymeric dispersants is in the range of 1000–30000, and the acid value of the same is in the range of 100 to 430. Examples of surfactant-based dispersants include laurylbenzene sulfonate, lauryl sulfonate, laurylbenzene-carboxylate, laurylnaphthalene sulfonate, salts of aliphatic amine, and poly(ethylene oxide) condensation product. The amount of the dispersants used is preferably in the range of pigment weight:dispersant weight of 10:5 to 10:0.5.

(Self-dispersible Carbon Black)

Also applicable are carbon black which have been made self-dispersable by introducing water-soluble groups onto the surface as described in Japanese Patent Application Laid-Open No. 5-186704 and Japanese Patent Application Laid-Open No. 8-3498. When using such a self-dispersing type carbon black, a dispersant is not necessary.

These dyes and pigments may be used alone or in combination. Generally, the content of these dyes and pigments is properly selected from the range of 0.1–20 wt % of the total ink weight.

(b) Liquid Media

Now the liquid medium used in the present invention is described. As a liquid medium, preferably a water-containing medium, especially mixed media of water and water-soluble solvents are used. Preferably, water used in the present invention is deionized water, not ordinary water which contains various ions. The water content is preferably in the range of 35–96 wt % of the total amount of the aqueous pigment ink. Water-soluble organic solvents are used to adjust the ink viscosity, to slow down the ink drying rate and to enhance the solubility of coloring materials in ink so as to prevent clogging of the nozzles of recording head.

The above solvent is exemplified by alkyl alcohols of 1–5 carbons such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or keto alcohols such as acetone, diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols having an alkylene group of 2–6 carbons, such as ethylene glycol, propylene glycol, trimethylene glycol, triethylene glycol, 1,2,6-hexantriol; glycerol; trimethylolethane, trimethylolpropane; lower alkyl ethers such as ethylene glycol monomethyl(or monoethyl) ether and diethylene glycol monomethyl(or monoethyl) ether;

lower dialkyl ethers of polyhydric alcohol, such as triethylene glycol dimethyl (or diethyl) ether and tetraethylene glycol dimethyl (or diethyl) ether; alkanolamines such as monoethanolamine, diethanolamine and triethanolamine; sulfolane, N-methyl-2-pyrrolidone, 2-pyrrolidone, and 1,3-dimethyl-2-imidazolydinone. The above water-soluble organic solvents can be used individually or as a mixture of two or more solvents.

<Additives>

The ink of the present invention may properly contain various additives such as adjusting agents, pH adjusting agents, antimolds, preservatives, antioxidants, defoaming agents, surfactants and humectants such as urea for preventing nozzle from drying. The pH adjusting agent is exemplified by lithium hydroxide, sodium hydroxide, potassium hydroxide, ammonium hydroxide, acetic acid, sulfuric acid, nitric acid, phosphoric acid, and salts thereof.

<Physical Properties of Ink>

Physical properties of the ink according to the present invention are: pH is preferably in the range of 3–12, more preferably 4–10 at around 25° C.; surface tension is preferably in the range of 10–60 dyn/cm, more preferably 15–50 dyn/cm; and viscosity is preferably in the range of 1–30 cps, more preferably 1–10 cps.

<Recording Method>

The method suitable for recording with the ink of the present invention is the ink-jet recording method in which ink droplets are formed by the thermal energy applied to the ink according to recording signals in the recording head. A recording apparatus in which the ink of the present invention described above is used is described with reference to the drawings.

First Embodiment

First, the recording method using the ink of the first embodiment.

Figure 2:
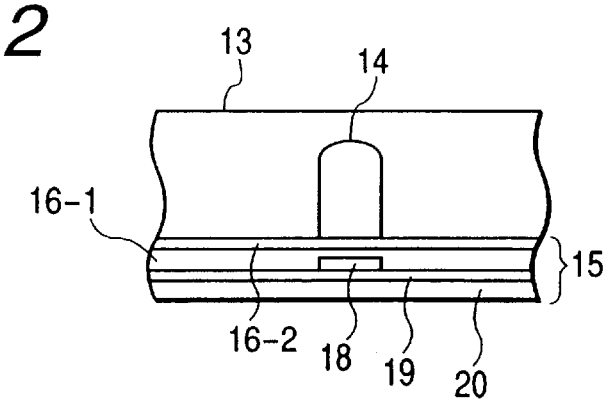
FIG. 2 is a horizontal sectional view of one example head of an ink-jet recording apparatus.

FIGS. 1 and 2 show an example of constitution of the main part of an ink-jet recording apparatus which utilizes thermal energy. FIG. 1 is a sectional view of a head 13 taken along the ink flow path, and FIG. 2 is a sectional view taken along line 2—2 of FIG. 1. The head 13 is prepared by gluing a substrate with a heat generating element 15 to a board of glass, ceramic, silicon, polysulfone or plastic board on which a flow path (nozzle) 14 for ink is provided. The substrate with a heat generating element 15 comprises a protection layer 16-1 made of silicon oxide, silicon nitride or silicon carbide, an outermost protection layer 16-2 made of a metal such as platinum or metal oxide thereof, preferably made of tantalum or oxide of tantalum, electrodes 17-1 and 17-2 made of aluminum, gold or aluminum-copper alloy, a heat generating resistor layer 18 made of a high melting point material such as hafnium boride, tantalum nitride or aluminum tantalate, a heat accumulation layer 19 made of silicon oxide or aluminum oxide, and a substrate 20 made of a heat-radiative material such as silicon, aluminum or aluminum nitride.

Figure 3:
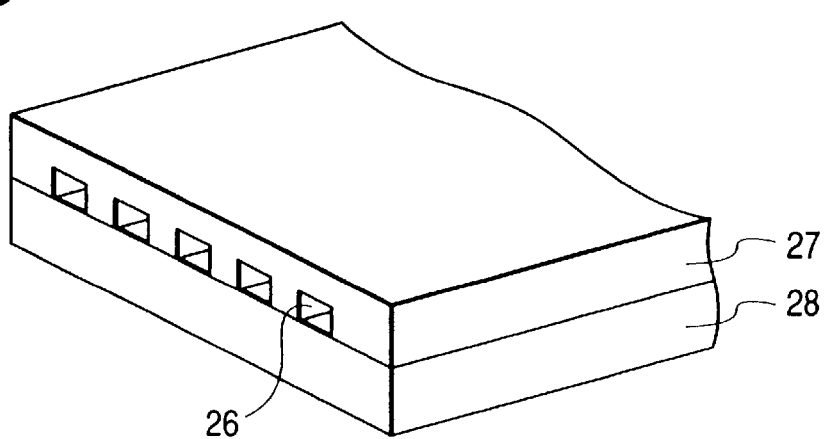
FIG. 3 shows an external appearance in perspective of a head where the head shown in FIG. 1 is multiplied.

When electric pulse signals are applied to the electrodes 17-1 and 17-2 of the above head 13, the region designated with n (heater) of the heat generating substrate 15 rapidly generates heat, thereby a bubble is formed in the ink 21 in contact with the above region. Due to the pressure of the bubble, the meniscus 23 protrudes to eject the ink 21 through the nozzle 14 of the head, and the ink ejected from a discharge orifice 22 as a droplet flies toward and lands on a recording medium 25. FIG. 3 shows an outer view of one example of the multi-head type recording head in which the heads shown in FIG. 1 are lined up in an integral unit. This multi-head type recording head is prepared by gluing a glass plate 27 having a multi-nozzle 26 and a heat generating head 28 as described in FIG. 1.

<Amount of Energy Applied to Heater>

Value r is a factor which represents the ratio of the energy actually applied to the heater and the critical energy with which the bubble jet head can eject ink. When the width of the pulse applied to the bubble jet head is denoted by P (when multiple pulses are applied separately, the sum of each pulse width is denoted by P), the voltage applied to the head is denoted by V and the resistance of the heater is denoted by R, then the energy E applied to the heater can be expressed by the following equation:

$$E = P \times V^2 / R \tag{A}$$

When the lowest energy with which the bubble jet head can eject ink is denoted by Eth and the energy actually applied to the heater is denoted by Eop, then the value r is obtained from the following equation:

$$r = Eop/Eth \tag{B}$$

To determine r from the operation conditions of the bubble jet head, there are, for example, two methods shown below.

Method 1. Fixed Pulse Width

The bubble jet head is operated at a given pulse width and at a proper voltage at which the above head can eject ink. Then the voltage is lowered slowly so as to find a voltage at which ejection stops. Threshold voltage is a voltage immediately before the voltage at which ejection stopped and denoted by Vth. If the voltage actually used to operate the head is denoted by Vop, then the value r is obtained from the following equation (C):

$$r = (Vop/Vth)^2 \tag{C}$$

Method 2. Fixed Voltage

The bubble jet head is driven at a given voltage with a proper pulse width at which the above head can eject ink. Then the pulse width is decreased slowly so as to find a pulse width at which ejection stops. Let Pth denote the minimum pulse width just before the found pulse width. If the pulse width actually used to drive the head is denoted by Pop, then a value r is obtained from the following equation (D):

$$r = Pop/Pth$$

The above voltage means the voltage actually applied to the BJ heater to generate heat. The voltage applied from the outside of the head may decrease due to the contacts, wiring resistance, etc.; however, when Vth and Vop are measured from the outside of the head, both measurements include the voltage fluctuation. Accordingly, unless the fluctuations are considerably large, the value r calculated directly using the measured values may be used without serious error.

It should be noted that, when carrying out recording by an actual printer, multiple heaters are driven at the same time, which can cause the voltage fluctuation applied to one heater.

From the above equations (A) and (B), it appears that $V^2$ is inversely proportional to P when r is constant. However, actually, the relationship between $V^2$ and P is not so simple, since there are various problems intertwined with each other: an electrical problem that the pulse shape does not become rectangular, a thermal problem that the thermal diffusion in the vicinity of heater differs with the shape of pulse, and a problem peculiar to the bubble jet head that the thermal flow from heater to the ink varies with the voltage to change the bubbling state. Accordingly, Method 1 and Method 2 described above should be treated independently. It is noted that errors may arise if the value obtained from one method is converted to that of the other method by calculation. Unless otherwise specified, the value r obtained by Method 1 is used in the present invention.

Generally, the head is driven at an r value of about 1.12–1.96 to eject ink in a stable manner. However, when the ink of the present invention is used to be ejected from a recording head by applying thermal energy thereto, the head is preferably driven at an r value in the pre-determined range, that is, in the range of 1.10–1.75. This enables the prevention of kogation on the heater and thereby elongation of the recording head life.

When an image is formed at a high r value, the ammonium salt of an acid having a methyl or methylene group and a carboxyl group being an ink component of the first embodiment of the invention, tends to corrode the outermost metal and/or metal oxide protection layer of the heater, to destroy the heater and shorten the head life. The reason why the outermost layer of the heater is corroded with a high r value has not been known yet. However, it is considered that when the r value is high, the temperature of the heater surface becomes excessively raised as the excessive energy is supplied thereto, which causes the corrosion of the metal by the ammonium salt of such an acid, that is, as the temperature of the protection layer becomes higher, the metal of the protection layer is more subject to be corroded by the acid ammonium salt. Accordingly, in the ink-jet recording method of the invention, it is preferable to drive the heater at the r value of 1.10–1.75 when the ink of the first embodiment of the invention is used.

Also, when the ink of the second embodiment of the invention containing an ammonium salt of an aldonic acid as the ink component (c) is used at a high r value, also the ammonium citrate tends to corrode the outermost metal or metal oxide protection layer of the heater, to destroy the heater and shorten the head life, when the r value is high. The reason why the outermost layer of the heater is corroded at a high r value has not been known yet. However, it is considered that when the r value is high, the temperature of the heater surface becomes excessively raised as the excessive energy is supplied thereto, which causes the corrosion of the metal by the ammonium salt of such an acid, that is, as the temperature of the protection layer becomes higher, the metal of the protection layer is more subject to be corroded by the ammonium aldonate. Accordingly, it is preferable to drive the heater at the r value of 1.10–1.90 in the ink-jet recording method using the ink of the second embodiment of the invention.

Further, when the ink of the third embodiment of the invention containing ammonium dihydrogen citrate, diammonium hydrogen citrate or triammonium citrate as the ink component (c) is used at a high r value, also the ammonium citrate tends to corrode the outermost metal or metal oxide protection layer of the heater, to destroy the heater and shorten the head life, when the r value is high. The reason why the outermost layer of the heater is corroded at a high r value has not been known yet. However, it is considered that when the r value is high, the temperature of the heater surface becomes excessively raised as the excessive energy is supplied thereto, which causes the corrosion of the metal by the ammonium salt of such an acid, that is, as the temperature of the protection layer becomes higher, the metal of the protection layer is more subject to be corroded by the ammonium citrate. Accordingly, it is preferable to drive the heater at the r value of 1.10–1.70 in the ink-jet recording method using the ink of the third embodiment of the invention.

<Ink-jet Recording Apparatus>

Figure 4:
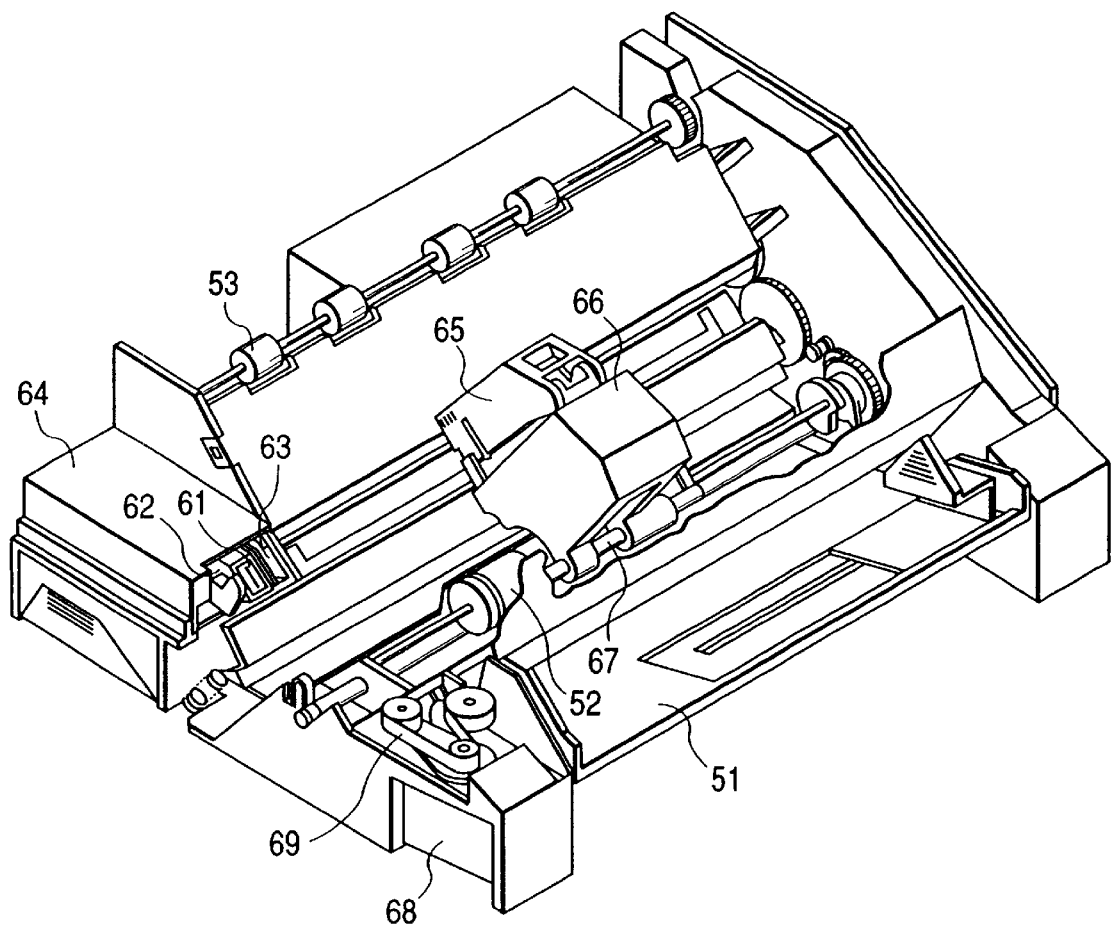
FIG. 4 is a schematic view in perspective of one example ink-jet recording apparatus.

FIG. 4 shows one example of the ink-jet recording apparatus in which such a head is incorporated. In FIG. 4, reference numeral 61 designates a blade as a wiping member which is supported with and fixed to a blade-supporting member at one end and has a cantilever-like shape. The blade 61 is arranged in a position adjacent to the recording region of a recording head 65. In this example, the blade is held in a projecting form in the path along which the recording head 65 moves.

Reference numeral 62 denotes a cap for an ejection opening of the recording head 65, in which the cap is arranged in a home position adjacent to the blade 61 and moves in the direction perpendicular to the moving direction of the recording head 65 so as to cap the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 designates a recording head. The head contains means for generating ink-ejecting energy and performs recording by ejecting ink towards a recording medium opposite to the ink-ejecting opening. Numeral 66 designates a carriage for carrying the recording head 65 so that it can move. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a paper feeding portion for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 evacuates from the moving path of the recording head, but the blade 61 is projecting in the moving path. As a result, the ink ejecting opening of the recording head 65 is wiped.

The cap 62 moves into the moving path of the recording head 65 in a projecting manner to touch the ejection opening of the head 65 for capping. While the recording head 65 is moving from its home position to a recording start position, the cap 62 and the blade 61 take the same position as when wiping is carried out. As a result, the ejecting opening of the head 65 is wiped even during this movement. The recording head not only returns to its home position after completion of recording and during ejection recovery, but also returns to the home position adjacent to the recording region when moving in the recording region for recording, at prescribed intervals. With this movement, the above wiping is also carried out.

Figure 5:
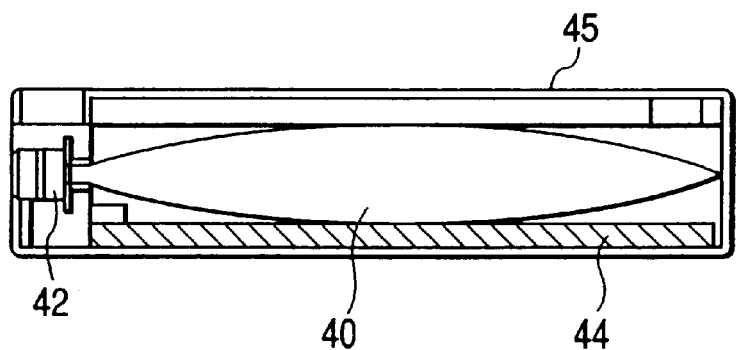
FIG. 5 is a vertical sectional view of one example ink cartridge to show the internal configuration.

FIG. 5 shows one example of an ink cartridge for storing ink and for feeding ink to the recording head through an ink feeding member, such as tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designates an ink absorber for receiving waste ink. For the ink storage portion, its surface in contact with ink is preferably made of polyolefin, particularly polyethylene.

Figure 6:
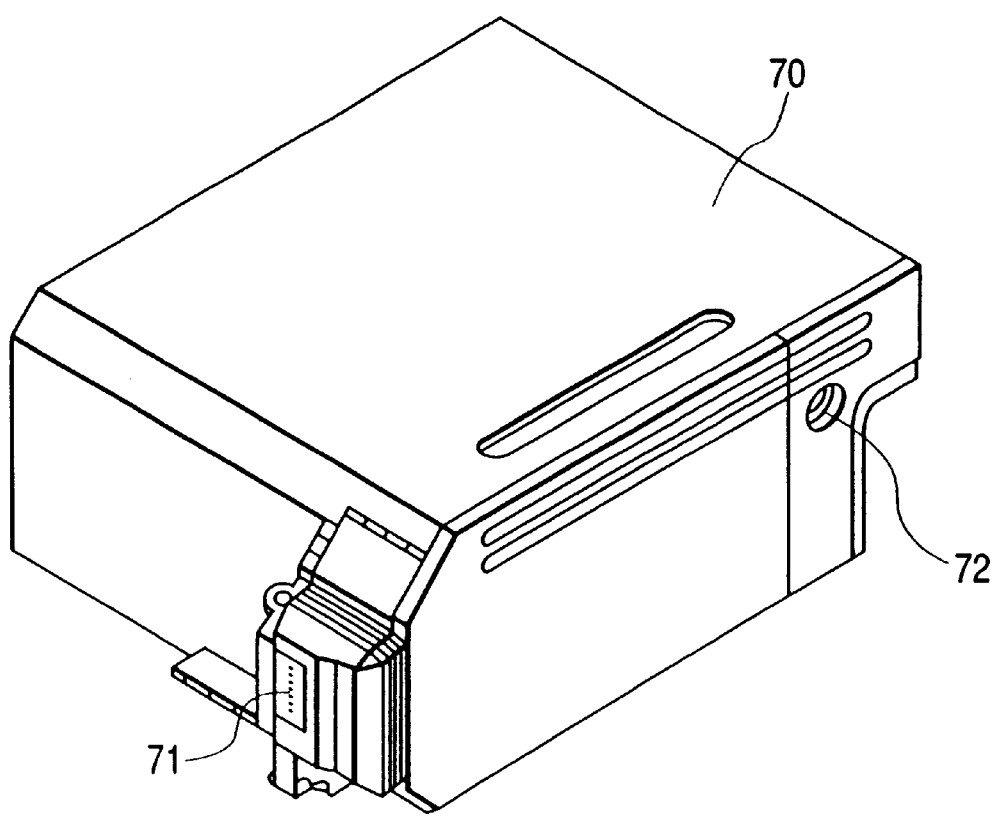
FIG. 6 is a perspective view of one example recording unit.

The ink-jet recording apparatus for use in the present invention is not limited to the aforementioned type in which an ink cartridge is not furnished as an integral part of the head, as shown in FIG. 6. The type in which the above two are integrated into one part is also preferably used. In FIG. 6, reference numeral 70 designates a recording unit which contains an ink storage portion for storing ink, for example, an ink absorber. In the arrangement of the above unit, ink in the ink absorber is ejected as an ink droplet from a head portion 71 having multiple orifices in it. As a material for the ink absorber, polyurethane is preferably used in the present invention. An integral constitution in which no ink absorber is used and the ink storage portion is an ink bag having a spring within it may be used. Numeral 72 designates an opening for connecting the inside of the cartridge with air. This recording unit 70 is used in place of the recording head 65 shown in FIG. 4 and detachably attached to the carriage 66.

EXAMPLES

The present invention is explained in more detail with reference to the following examples and comparative examples. These examples are intended to illustrate the invention and are not construed to limit the scope of the invention. Unless otherwise stated, "parts" and "%" are expressed by weight.

A: The First Embodiment

Examples A-1 to A-3 and Comparative Example A-1

In Example A-1 and Comparative Example A-1, the following components were mixed, well-stirred and dissolved, then subjected to pressure filtration with a microfilter of 0.2 μm in pore size (from Fuji Photo Film Co., Ltd.) to prepare the ink.

<Ink Composition of Example A-1>

| | |
|---|---|
| PROJET FAST BLACK 2 (available from Zeneca) | 2 parts |
| diethylene glycol | 10 parts |
| 50% aqueous solution of ammonium lactate | 4 parts |
| ammonia water 28% | 0.3 parts |
| water | 83.7 parts |

<Ink Composition of Comparative Example A-1>

| | |
|---|---|
| PROJET FAST BLACK 2 (available from Zeneca) | 2 parts |
| diethylene glycol | 10 parts |
| ammonia water 28% | 0.3 parts |
| water | 87.7 parts |

Evaluation 1

Vth (threshold voltage for ejecting ink) was measured at pulse widths of 1.1 μs (on)+3.0 μs (off)+3.2 μs (on) and an operation frequency of 6250 Hz, using the ink of Example A-1 described above and an ink-jet recording apparatus having an on-demand type multiple recording head (BC-02, from Canon Inc.) where the outermost protection layer on the heater consists of tantalum and oxide thereof) and ink is ejected by applied thermal energy according to recording signals. Then ejection durability and kogation were estimated according to the following methods and criteria. The result is shown in Table 1. Vop (operation voltage) was calculated from the following equation:

$$Vop = \sqrt{r} \times Vth.$$

Ejection Durability

A continuous ejection with the ink of Example A-1 was performed by using the above apparatus and operation conditions. The ink droplets of $1 \times 10^6$ shots, ejected from the recording head, were collected in a container and weighed with the container by an electronic balance. The average ink droplet weight during $1 \times 10^6$ shots was calculated from the weight increase. The continuous ejection was performed until $1 \times 10^8$ shots. The evaluation criteria were as follows:

A: The average weight of the ink droplets ejected during $9.9 \times 10^7 - 1 \times 10^8$ shots is 90% or more of that during $0 - 1 \times 10^6$ shots.

B: The average amount of the ink droplets ejected during $9.9 \times 10^7 - 1 \times 10^8$ shots is from 70% and less than 90% of that during $0 - 1 \times 10^6$ shots.

C: The average amount of the ink droplets ejected during $9.9 \times 10^7 - 1 \times 10^8$ shots is less than 70% of that during $0 - 1 \times 10^6$ shots.

D: Ejection stopped before $1 \times 10^8$ shots.

Amount of Koga

The recording head having been subjected to the above ejection durability evaluation was disassembled, and the surface of the heater in the nozzle was observed under an optical microscope (400 magnifications). The amount of koga was evaluated using the following criteria:

A: Little koga was observed;
B: A little koga was observed;
C: Certain amount of koga was observed;
D: Large amount of koga was observed.

In Examples A-2 and A-3, estimations were carried out at Vop values corresponding to r=1.10 and r=1.71, respectively. In these examples, ink of Example A-1 was used. The result is shown in Table 1.

In Reference Examples A-1, evaluation was carried out as above at Vop (drive voltage) values corresponding to r=1.39. The result is shown in Table 1.

Examples A-4 to A-14

The components shown below were mixed, fully stirred and dissolved, then subjected to pressure filtration with a microfilter of 0.2 μm pore size (from Fuji Photo Film Co., Ltd.), to prepare ink for use in Examples A-4 to A-11.

<Ink Composition for Example A-4>

| | |
|---|---|
| PROJET FAST BLACK 2 (available from Zeneca) | 2 parts |
| diethylene glycol | 10 parts |
| diammonium succinate | 2 parts |
| sodium hydroxide | 0.1 part |
| water | 85.9 parts |

<Ink Composition for Example A-5>

| | |
|---|---|
| PROJET FAST BLACK 2 (available from Zeneca) | 2 parts |
| diethylene glycol | 10 parts |
| ammonium hydrogen L-aspartate | 2 parts |
| sodium hydroxide | 0.1 part |
| water | 85.9 parts |

<Ink Composition for Example A-6>

| | |
|---|---|
| PROJET FAST BLACK 2 (available from Zeneca) | 2 parts |
| diethylene glycol | 10 parts |
| diammonium malate | 2 parts |
| sodium hydroxide | 0.1 part |
| water | 85.9 parts |

<Ink Composition for Example A-7>

| | |
|---|---|
| PROJET FAST YELLOW 2 (available from Zeneca) | 3 parts |
| diethylene glycol | 10 parts |
| 50% ammonium lactate aqueous solution | 2 part |
| water | 85 parts |

<Ink Composition for Example A-8>

| | |
|---|---|
| PROJET FAST MAGENTA 2 (available from Zeneca) | 3 parts |
| diethylene glycol | 10 parts |
| 50% ammonium lactate aqueous solution | 4 parts |
| water | 83 parts |

<Ink Composition for Example A-9>

| | |
|---|---|
| PROJET FAST CYAN 2 (available from Zeneca) | 4 parts |
| diethylene glycol | 10 parts |
| 50% ammonium lactate aqueous solution | 2 part |
| water | 84 parts |

<Ink Composition for Example A-10>

| | |
|---|---|
| PROJET FAST BLACK 2 (available from Zeneca) | 2 parts |
| glycerol | 5 parts |
| diethylene glycol | 5 parts |
| urea | 4 parts |
| 2-propanol | 3.5 parts |
| 50% ammonium lactate aqueous solution | 4 parts |
| sodium hydroxide | 0.1 parts |
| ammonium sulfate | 0.1 parts |
| water | 76.3 parts |

Ink Preparation for Example A-11

| | |
|---|---|
| <Preparation of Pigment dispersion 1> | 5 parts |
| styrene-acrylic acid-butyl acrylate copolymer | |
| (acid value 116, average molecular weight 3700) | |
| triethanolamine | 0.5 parts |
| diethylene glycol | 5 parts |
| water | 69.5 parts |

The above components were mixed and heated in a water bath to 70° C., so that the resin component was fully dissolved. Then carbon black "MA-100" (pH 3.5; available from Mitsubishi Chemical Industries Ltd.), 15 parts, and 2-propanol, 5 parts, were added to this solution. After premixing for 30 minutes, the solution was subjected to dispersing treatment under the following conditions:
  Disperser: SAND GRINDER (available from Igarashi Kikai Co., Ltd.)
  Grinding Media: zirconium beads 1 mm in diameter
  Grinding Media Charge: 50% (volume)
  Grinding Time: 3 hours Then the above solution was subjected to centrifugal dispersing treatment (12000 rpm, 20 minutes) to remove large-size particles. Thus obtained was the pigment dispersion 1.

<Preparation of Ink>

The components below were mixed in a beaker and stirred at 25° for 3 hours. Thus obtained was the ink for Example A-11.

| | |
|---|---|
| pigment dispersion 1 | 30 parts |
| diethylene glycol | 10 parts |
| 2-propanol | 2 parts |
| 50% ammonium lactate aqueous solution | 1 part |
| water | 56 parts |

Ink Preparation for Example A-12

<Preparation of Pigment dispersion 2>

Into 1000 ml of water, 300 g of commercially available acid carbon black "MA77" (pH 3; available from Mitsubishi Chemical Corp.) was fully mixed, and then, 450 g of sodium hypochlorite (12% available chlorine concentration) was added dropwise to the solution, and the mixture was stirred at 100–105° C. for 10 hours. The slurry thus obtained was filtered with TOYO Filter Paper No. 2 (available from Advantest Corporation), and the pigment particles were fully washed with water. This wet pigment cake was dispersed again into 3000 ml of water and the dispersion was deionized with a reverse osmosis membrane until the electric conductivity became 0.2 $\mu$s. This pigment dispersion (pH=8–10) was further concentrated to a pigment concentration of 10 wt %. Thereby, —COONa group was thus introduced onto the surface of the carbon black.

<Preparation of Ink>

The components below were mixed in a beaker and stirred at 25° C. for 3 hours. Then the mixture was subjected to pressure filtration with a membrane filter of 3.0 $\mu$m pore size (available from Sumitomo Electric Industries, Ltd.). Thus obtained was ink for Example A-12.

| | |
|---|---|
| pigment dispersion 2 | 30 parts |
| glycerol | 5 parts |
| trimethylolpropane | 5 parts |
| acetyleneglycol ethylene oxide addition product | 0.2 parts |
| (Trade name: Acetylenol EH, Kawaken Fine Chemicals Co., Ltd.) | |
| 50% ammonium lactate aqueous solution | 2 part |
| water | 57.8 parts |

Ink Preparation for Example A-13

| | |
|---|---|
| <Preparation of Pigment dispersion 3> | 5.5 parts |
| styrene-acrylic acid copolymer | |
| (acid value 200, average molecular weight 7000)] | |
| monoethanolamine | 1.0 part |
| ion-exchange water | 67.5 parts |
| diethylene glycol | 5.0 parts |

The above components were mixed and heated in a water bath to 70° C., so that the resin component was fully dissolved. Then 20 parts of C.I. Pigment Yellow 93 and 1.0 part of isopropyl alcohol were added to this solution. After premixing for 30 min, the solution was subjected to dispersing treatment under the following conditions:

Disperser: SAND GRINDER
Grinding Media: glass beads 1 mm in diameter
Grinding Media Charge: 50% (volume)
Grinding Time: 3 hours Then the above solution was subjected to centrifugal dispersing treatment (12000 rpm, 20 minutes) to remove coarse particles. Thus obtained was the pigment dispersion 3.

<Preparation of Ink>

The components below were mixed in a beaker and stirred at 25° C. for 3 hours. Thus obtained was the ink for Example A-13.

| | |
|---|---|
| pigment dispersion 3 | 20 parts |
| glycerol | 15 parts |
| diethylene glycol | 10 parts |
| Acetylenol EH (available from Kawaken Fine Chemicals Co., Ltd.) | 0.3 parts |
| 50% ammonium lactate aqueous solution | 2 part |
| water | 52.7 parts |

Ink Preparation for Example A-14

| | |
|---|---|
| (Preparation of Pigment dispersion 4) styrene-acrylic acid copolymer (acid value 200, average molecular weight 7000) | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved. Then 20 parts of C.I. Pigment Red 122 and 1.0 part of isopropyl alcohol were added to this solution. After premixing for 30 minutes, the solution was subjected to dispersing treatment under the following conditions:

Disperser: SAND GRINDER
Grinding Media: glass beads 1 mm in diameter
Grinding Media Charge: 50% (volume)
Grinding Time: 3 hours Then the above solution was subjected to centrifugal dispersing treatment (12000 rpm, 20 minutes) to remove coarse particles. Thus obtained was the pigment dispersion 4.

<Preparation of Ink>

The components below were mixed in a beaker and stirred at 25° for 3 hours. Thus obtained was the ink for Example A-13.

| | |
|---|---|
| pigment dispersion 4 | 20 parts |
| glycerol | 15 parts |
| diethylene glycol | 10 parts |
| Acetylenol EH (available from Kawaken Fine Chemicals Co., Ltd.) | 0.3 parts |
| 50% ammonium lactate aqueous solution | 2 part |
| water | 52.7 parts |

Ink Preparation for Example A-15

| | |
|---|---|
| <Preparation of Pigment dispersion 5> styrene-acrylic acid copolymer (acid value 200, average molecular weight 7000) | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved.

Then 20 parts of C.I. Pigment Blue 15:3 and 1.0 part of isopropyl alcohol were added to this solution. After premixing for 30 minutes, the solution was subjected to dispersing treatment under the following conditions:

Disperser: SAND GRINDER
Grinding Media: glass beads 1 mm in diameter
Grinding Media Charge: 50% (volume)
Grinding Time: 3 hours Then the above solution was subjected to centrifugal dispersing treatment (12000 rpm, 20 minutes) to remove coarse particles. Thus obtained was the pigment dispersion 5.

<Preparation of Ink>

The components below were mixed in a beaker and stirred at 25° C. for 3 hours. Thus obtained was an ink of Example A-15.

| | |
|---|---|
| pigment dispersion 5 | 20 parts |
| glycerol | 15 parts |
| diethylene glycol | 10 parts |
| Acetylenol EH (available from Kawaken Fine Chemicals Co., Ltd.) | 0.3 parts |
| 50% ammonium lactate aqueous solution | 2 part |
| water | 52.7 parts |

Ink Preparation for Comparative Examples A-2 to A-11

The components shown below were mixed, fully stirred and dissolved, then subjected to pressure filtration with a microfilter of 0.2 μm pore size (from Fuji Photo Film Co., Ltd.) to prepare the inks for use in Comparative Examples A-2 to A-6. Pigment inks in Comparative Examples 1-7 to A-11 were prepared using the pigment dispersions in Examples A-11 to A-15.

<Ink Composition for Comparative Example A-2>

| | |
|---|---|
| PROJET FAST BLACK 2 (available from Zeneca) | 2 parts |
| diethylene glycol | 10 parts |
| sodium hydroxide | 0.1 part |
| water | 87.9 parts |

<Ink Composition for Comparative Example A-3>

| | |
|---|---|
| PROJET FAST YELLOW 2 (available from Zeneca) | 3 parts |
| diethylene glycol | 10 parts |
| water | 87 parts |

<Ink Composition for Comparative Example A-4>

| | |
|---|---|
| PROJET FAST MAGENTA 2 (available from Zeneca) | 3 parts |
| diethylene glycol | 10 parts |
| water | 87 parts |

<Ink Composition for Comparative Example A-5>

| PROJET FAST CYAN 2 (available from Zeneca) | 4 parts |
|---|---|
| diethylene glycol | 10 parts |
| water | 86 parts |

<Ink Composition for Comparative Example A-6>

| PROJET FAST BLACK 2 (available from Zeneca) | 2 parts |
|---|---|
| glycerol | 5 parts |
| diethylene glycol | 5 parts |
| urea | 5 parts |
| sodium hydroxide | 0.1 parts |
| ammonium sulfate | 0.1 parts |
| water | 82.8 parts |

<Ink Composition for Comparative Example A-7>

The components below were mixed in a beaker and stirred at 25° C. for 3 hours. Thus obtained was the ink for Comparative Example A-7.

| pigment dispersion 1 | 30 parts |
|---|---|
| diethylene glycol | 10 parts |
| 2-propanol | 2 parts |
| water | 58 parts |

<Ink Composition for Comparative Example A-8>

The components below were mixed in a beaker and stirred at 25° C. for 3 hours. Then the mixture was subjected to pressure filtration with a membrane filter (pore size: 3.0 μm, available from Sumitomo Electric Industries, Ltd.). Thus obtained was the ink for Comparative Example A-8.

| pigment dispersion 2 | 30 parts |
|---|---|
| glycerol | 5 parts |
| trimethylolpropane | 5 parts |
| acetyleneglycol ethylene oxide addition product (Trade name: Acetylenol EH, Kawaken Fine Chemicals Co., Ltd.) | 0.2 parts |
| water | 59.8 parts |

<Ink Preparation for Comparative Example A-9>

The components below were mixed in a beaker and stirred at 25° C. for 3 hours. Thus obtained was the ink for comparative Example A-9.

| pigment dispersion 3 | 20 parts |
|---|---|
| glycerol | 15 parts |
| diethylene glycol | 10 parts |
| Acetylenol EH (Kawaken Fine Chemicals Co., Ltd.) | 0.3 parts |
| water | 54.7 parts |

<Ink Preparation for Comparative Example A-10>

The components below were mixed in a beaker and stirred at 25° C. for 3 hours. Thus obtained was the ink for Comparative Example A-10.

| pigment dispersion 4 | 20 parts |
|---|---|
| glycerol | 15 parts |
| diethylene glycol | 10 parts |
| Acetylenol EH (Kawaken Fine Chemicals Co., Ltd.) | 0.3 parts |
| water | 54.7 parts |

<Ink Preparation for Comparative Example A-11>

The components below were mixed in a beaker and stirred at 25° C. for 3 hours. Thus obtained was the ink for Comparative Example A-11.

| pigment dispersion 5 | 20 parts |
|---|---|
| glycerol | 15 parts |
| diethylene glycol | 10 parts |
| Acetylenol EH (Kawaken Fine Chemicals Co., Ltd.) | 0.3 parts |
| water | 54.7 parts |

Evaluation 2

With inks of Examples A-4 to A-15 and Comparative Examples A-2 to A-11, evaluation was carried out as follows. First, Vth (threshold voltage for ejecting ink) was determined at pulse widths of 1.1 μs (on)+3.0 μs (off)+3.2 μs (on) and an operation frequency of 6250 Hz, using each ink and an ink-jet recording apparatus having an on-demand type multiple recording head (BC-02, from Canon Inc.), where the outermost protection layer on the heater consists of tantalum and oxide thereof) and ink is ejected by applied thermal energy according to recording signals. Then applying a Vop corresponding to r=1.39, ink ejection was carried out, and the ejection durability and kogation on the heater surface were evaluated for each ink in the same manner as in Evaluation 1. The results are shown in Table 2.

B: The Second Embodiment

Examples B-1 to B-3, Reference Examples B-1 and B-2, and Comparative Example B-1

Following components were mixed, well-stirred and dissolved, then subjected to pressure filtration with a microfilter of 0.2 μm in pore size (from Fuji Photo Film Co., Ltd.) to prepare the ink of Example B-1. The ink of Comparative Example B-1 was prepared in the same manner except that ammonium gluconate is replaced with water of the same amount.

<Ink Composition of Example B-1>

| PROJET FAST BLACK 2 (Zeneca) | 2 parts |
|---|---|
| Diethylene glycol | 10 parts |
| Ammonium gluconate | 2 parts |
| Sodium hydroxide | 0.1 parts |
| Water | 85.9 parts |

<Ink Composition of Comparative Example B-1>

| PROJET FAST BLACK 2 (Zeneca) | 2 parts |
|---|---|
| Diethylene glycol | 10 parts |
| Sodium hydroxide | 0.1 parts |
| Water | 87.9 parts |

<Evaluation 1>

The above described ink of Example B-1 was ejected by applying a Vop (operation voltage) corresponding to the r value of 1.39 using the same apparatus as described in Evaluation 1 of Example A-1. As a result, it was confirmed that the ink of Example B-1 is comparable to the conventional ink-jet ink and satisfactorily usable as an ink-jet ink.

By using the ink of Example B-1, ink ejection was carried out with operation voltages (Vop) corresponding to the r value of 1.10 (Example B-2), or 1.90 (Example B-3). In addition, the ink of Example B-1 was ejected with a Vop corresponding to the r value of 1.92 (Reference Example B-1) or 1.96 (Reference Example B-2). Also, the ink of Comparative Example B-1 was ejected with a Vop corresponding to the r value of 1.38 (Comparative Example B-1). Subsequently, evaluation was carried out by the same method and standards as in Example A-1. The results are shown in Table 3.

Examples B-4 to B-16

Inks of Examples B-4 to B-16 were prepared by mixing following components. For pigment inks, the components and the pigment dispersion were mixed and subjected to pressure filtration with a membrane filter of 3.0 $\mu$m pore size (available from Sumitomo Electric Industries, Ltd.). For dye inks, components shown below were mixed, fully stirred and dissolved, then subjected to pressure filtration with a microfilter of 0.2 $\mu$m pore size (from Fuji Photo Film Co., Ltd.)

Table 4 shows the compositions of the inks of Examples B-4 to B-16.

<Ink Composition of Example B-4>

| PROJET FAST BLACK 2 (Zeneca) | 2 parts |
| Diethylene glycol | 10 parts |
| Ammonium glucoheptonate | 2 parts |
| Water | 86 parts |

<Ink Composition of Example B-5>

| PROJET FAST YELLOW 2 (Zeneca) | 3 parts |
| Diethylene glycol | 10 parts |
| Ammonium gluconate | 2 parts |
| Water | 85 parts |

<Ink Composition of Example B-6>

| PROJET FAST MAGENTA 2 (Zeneca) | 3 parts |
| Diethylene glycol | 10 parts |
| Ammonium gluconate | 2 parts |
| Water | 85 parts |

<Ink Composition of Example B-7>

| PROJET FAST CYAN 2 (Zeneca) | 4 parts |
| Diethylene glycol | 10 parts |
| Ammonium gluconate | 2 parts |
| Water | 84 parts |

<Ink Composition of Example B-8>

| C.I. FOOD BLACK 2 | 3 parts |
| Glycerol | 5 parts |
| Ethylene glycol | 10 parts |
| 2-propanol | 3 parts |
| Ammonium gluconate | 0.5 parts |
| Water | 78.5 parts |

<Ink Composition of Example B-9>

| C.I. reactive red 180 (Zeneca) | 2.5 parts |
| Glycerol | 5 parts |
| Ethylene glycol | 10 parts |
| 2-propanol | 3 parts |
| Ammonium gluconate | 0.2 parts |
| Water | 78.8 parts |

<Ink Composition of Example B-10>

| C.I. direct blue 199 | 3 parts |
| Glycerol | 5 parts |
| Ethylene glycol | 10 parts |
| 2-propanol | 3 parts |
| Ammonium gluconate | 0.5 parts |
| Water | 78.5 parts |

<Ink Composition of Example B-11>

| PROJET FAST BLACK 2 (Zeneca) | 2 parts |
| Glycerol | 5 parts |
| Diethylene glycol | 5 parts |
| Urea | 4 parts |
| 2-propanol | 3.5 parts |
| Ammonium gluconate | 10 parts |
| Sodium hydroxide | 0.1 parts |
| Ammonium sulfa | 0.1 parts |
| Water | 70.3 parts |

Example B-12

In the same manner as in Example A-11, pigment dispersion 1 was prepared and used to prepare the ink of Example B-12.

<Preparation of the Ink of Example B-12>

The ink of Example B-12 was prepared by mixing the following components in a beaker and stirring the mixture at 25° C. for 3 hours.

| Pigment dispersion 1 | 30 parts |
| Diethylene glycol | 10 parts |
| 2-propanol | 2 parts |
| Ammonium gluconate | 1 part |
| Water | 57 parts |

Example B-13

In the same manner as in Example A-12, the pigment dispersion 2 was prepared and used to prepare the ink of Example B-13.

<Preparation of the Ink of Example B-13>

The ink of Example B-13 was prepared by mixing the following components in a beaker and stirring the mixture at 25° C. for 3 hours. This mixture was filtered with pressure through the microfilter (Sumitomo Denko K.K. made) with a pore size of 3 $\mu$m.

| Pigment dispersion 2 | 30 parts |
| Glycerol | 5 parts |

-continued

| | |
|---|---|
| Trimethyl propane | 5 parts |
| Acetylenol EH (Kawaken Fine Chemicals) | 0.2 parts |
| Ammonium gluconate | 1 part |
| Water | 58.8 parts |

Example B-14

In the same manner as in Example A-13, pigment dispersion 3 was prepared and used to prepare the ink of Example B-14.

(Preparation of the Ink of Example B-14)

The ink of Example B-14 used in the present invention was prepared by mixing the following components in the beaker to stir enough at 25° C. for 3 hours.

| | |
|---|---|
| Pigment dispersion 3 | 20 parts |
| Glycerol | 15 parts |
| Diethylene glycol | 10 parts |
| Acetylenol EH (Kawaken Fine Chemicals) | 0.3 parts |
| Ammonium gluconate | 1 part |
| Water | 53.7 parts |

Example B-15

In the same manner as in Example A-14, pigment dispersion 4 was prepared and used to prepare ink of Example B-15.

<Preparation of the Ink of Example B-15>

The ink of Example B-15 was prepared by mixing the following components in a beaker and stirring at 25° C. for 3 hours.

| | |
|---|---|
| Pigment dispersion 4 | 20 parts |
| Glycerol | 15 parts |
| Diethylene glycol | 10 parts |
| Acetylenol EH (Kawaken Fine Chemicals) | 0.3 parts |
| Ammonium gluconate | 1 part |
| Water | 53.7 parts |

Example B-16

In the same manner as in Example A-15, pigment dispersion 5 was prepared and used to prepare the ink of Example B-16.

<Preparation of the Ink of Example B-16>

The ink of Example B-16 was prepared by mixing the following components in the beaker and stirring at 25° C. for 3 hours.

| | |
|---|---|
| Pigment dispersion 5 | 20 parts |
| Glycerol | 15 parts |
| Diethylene glycol | 10 parts |
| Acetylenol EH (Kawaken Fine Chemicals) | 0.3 parts |
| Ammonium gluconate | 1 part |
| Water | 53.7 parts |

Comparative Examples B-2 to B-6

Inks of Comparative Examples B-2 and B-6 were prepared in the same manner as in Example B-4 to B-11 except that ammonium aldonate was replaced with water.

Evaluation 2

The inks of the above described Examples B-4 to B-16 and Comparative Examples B-2 to B-6 were evaluated by the same method and standards as in above <Evaluation 2>.

<Evaluation Result>

As a result, in Examples B-4 to B-16, both ejection durability and kogation (amount of koga) were evaluated as grade A, and other ink jet-recording characteristics were comparable to conventional ink-jet inks, satisfactorily usable as an ink-jet ink. On the other hand, the inks of Comparative Examples B-4 to B-6 were evaluated as grade B or below both in terms of ejection durability and kogation.

C: The Third Embodiment

Examples C-1 to C-3 and Comparative Example C-1

Following components were mixed, well-stirred and dissolved, then subjected to pressure filtration with a microfilter of 0.2 µm in pore size (from Fuji Photo Film Co., Ltd.) to prepare inks of Example C-1 and Comparative Example C-1.

<Ink Composition of Example C-1>

| | |
|---|---|
| PROJET FAST BLACK 2 (Zeneca) | 2 parts |
| Diethylene glycol | 10 parts |
| Triammonium citrate | 2 parts |
| Ammonia water, 28% | 0.3 parts |
| Water | 85.7 parts |

<Ink Composition of Comparative Example C-1>

| | |
|---|---|
| PROJET FAST BLACK 2 (Zeneca) | 2 parts |
| Diethylene glycol | 10 parts |
| Ammonia water, 28 | 0.3 parts |
| Water | 87.3 parts |

Evaluation 1

The above described ink of Example C-1 was ejected by applying a Vop (operation voltage) corresponding to the r value of 1.39 using the same apparatus as described in Evaluation 1 of Example A-1. The result is shown in Table 5.

By using the ink of Example C-1, ink ejection was carried out with operation voltages (Vop) corresponding to the r value of 1.10 (Example C-2), and 1.61 (Example C-3). Evaluation was carried out as above. The results are shown in Table 5.

The ink of Comparative Example C-1 containing water instead of ammonium citrate was ejected in the same manner as above by applying a Vop corresponding to the r value of 1.39 for evaluation. The result is shown in Table 5.

Examples C-4 to C-14

Inks of Examples C-4 to C-9 were prepared by mixing the following components. The mixture was fully stirred and dissolved, then subjected to pressure filtration with a microfilter of 0.2 µm pore size (from Fuji Photo Film Co., Ltd.). Pigment inks of Example C-10 to C-14 were prepared using the respective pigment dispersion.

<Ink Composition of Example C-4>

| PROJET FAST BLACK 2 (Zeneca) | 2 parts |
|---|---|
| Diethylene glycol | 10 parts |
| Diammonium citrate | 2 parts |
| Lithium hydroxide | 0.1 parts |
| Water | 85.9 parts |

<Ink Composition of Example C-5>

| PROJET FAST BLACK 2 (Zeneca) | 2 parts |
|---|---|
| Diethylene glycol | 10 parts |
| Diammonium citrate | 2 parts |
| Sodium hydroxide | 0.2 parts |
| Water | 85.8 parts |

<Ink Composition of Example C-6>

| PROJET FAST YELLOW 2 (Zeneca) | 3 parts |
|---|---|
| Diethylene glycol | 10 parts |
| Triammonium citrate | 1 part |
| Water | 86 parts |

<Ink Composition of Example C-7>

| PROJET FAST MAGENTA 2 (Zeneca) | 3 parts |
|---|---|
| Diethylene glycol | 10 parts |
| Triammonium citrate | 2 parts |
| Water | 85 parts |

<Ink Composition of Example C-8>

| PROJET FAST CYAN 2 (Zeneca) | 4 parts |
|---|---|
| Diethylene glycol | 10 parts |
| Triammonium citrate | 1 part |
| Water | 85 parts |

<Ink Composition of Example C-9>

| PROJET FAST BLACK 2 | 2 parts |
|---|---|
| Glycerol | 5 parts |
| Ethylene glycol | 5 parts |
| Urea | 4 parts |
| 2-propanol | 3.5 parts |
| Triammonium citrate | 2 parts |
| Sodium hydroxide | 0.1 parts |
| Ammonium sulfate | 0.1 parts |
| Water | 78.3 parts |

<Ink Composition of Example C-10>

In the same manner as in Example A-11, pigment dispersion 1 was prepared and used to prepare the ink of Example C-10.

<Preparation of the Ink of Example C-10>

The ink of Example C-10 was prepared by mixing the following components in a beaker and stirring the mixture at 25° C. for 3 hours.

| Pigment dispersion 1 | 30 parts |
|---|---|
| Diethylene glycol | 10 parts |
| 2-propanol | 2 parts |
| Triammonium citrate | 1 part |
| Water | 57 parts |

Example C-11

In the same manner as in Example A-12, the pigment dispersion 2 was prepared and used to prepare the ink of Example C-11.

<Preparation of the Ink of Example C-11>

The ink of Example C-11 was prepared by mixing the following components in a beaker and stirring the mixture at 25° C. for 3 hours. This mixture was filtered with pressure through the microfilter (Sumitomo Denko K.K. made) with a pore size of 3 $\mu$m.

| Pigment dispersion 2 | 30 parts |
|---|---|
| Glycerol | 5 parts |
| Trimethylpropane | 5 parts |
| Acetylenol EH (Kawaken Fine Chemicals) | 0.2 parts |
| Triammonium citrate | 1 part |
| Water | 58.8 parts |

Example C-12

In the same manner as in Example A-13, pigment dispersion 3 was prepared and used to prepare the ink of Example C-12.

<Preparation of the Ink of Example C-12>

The ink of Example C-12 was prepared by mixing the following components in a beaker and stirring at 25° C. for 3 hours.

| Pigment dispersion 3 | 20 parts |
|---|---|
| Glycerol | 15 parts |
| Diethylene glycol | 10 parts |
| Acetylenol EH (Kawaken Fine Chemicals) | 0.3 parts |
| Triammonium citrate | 1 part |
| Water | 53.7 parts |

Example C-13

In the same manner as in Example A-14, pigment dispersion 4 was prepared and used to prepare ink of Example C-13.

<Preparation of the Ink of Example C-13>

The ink of Example C-15 was prepared by mixing the following components in a beaker and stirring at 25° C. for 3 hours.

| Pigment dispersion 4 | 20 parts |
|---|---|
| Glycerol | 15 parts |
| Diethylene glycol | 10 parts |
| Acetylenol EH (Kawaken Fine Chemicals) | 0.3 parts |
| Triammonium citrate | 1 part |
| Water | 53.7 parts |

Example C-14

In the same manner as in Example A-15, pigment dispersion 5 was prepared and used to prepare the ink of Example C-14.

<Preparation of the Ink of Example C-14>

The ink of Example C-14 was prepared by mixing the following components in a beaker and stirring at 25° C. for 3 hours.

| | |
|---|---|
| Pigment dispersion 5 | 20 parts |
| Glycerol | 15 parts |
| Diethylene glycol | 10 parts |
| Acetylenol EH (Kawaken Fine Chemicals) | 0.3 parts |
| Triammonium citrate | 1 part |
| Water | 53.7 parts |

Comparative Example C-2

The ink of Comparative Example C-2 was prepared by mixing the following components. The mixture was fully stirred and dissolved, then subjected to pressure filtration with a microfilter of 0.2 μm pore size (from Fuji Photo Film Co., Ltd.).

<Ink Composition of Comparative Example C-2>

| | |
|---|---|
| PROJET FAST BLACK 2 (Zeneca) | 2 parts |
| Diethylene glycol | 10 parts |
| Sodium hydroxide | 0.2 parts |
| Water | 87.8 parts |

Evaluation 2

The inks of the above described Examples C-4 to C-14 and Comparative Example C-2 were evaluated by the same method and standards as in above <Evaluation 2>. The results are shown in Tables 6 and 7.

ADVANTAGE OF THE INVENTION

As described above, the present invention provides an ink, for use in an ink-jet recording utilizing thermal energy, which enables elongation of the life of a recording head by decreasing kogation on the heater thereof, a method for increasing the life of the recording head by decreasing kogation on the heater thereof, a method for ink-jet printing utilizing the above ink, and an ink-jet recording apparatus for the ink.

TABLE 1

| | Content of Component (c) | Vth (V) | r value | Vop (V) | (1) Ejection Durability | (2) Amount of Koga |
|---|---|---|---|---|---|---|
| Ex. A-1 | aqueous ammonium lactate 50% solution | 21.0 | 1.39 | 24.8 | A | A |
| Ex. A-2 | aqueous ammonium lactate 50% solution | 20.9 | 1.10 | 21.9 | A | A |
| Ex. A-3 | aqueous ammonium lactate 50% solution | 21.0 | 1.71 | 27.5 | A | A |
| Comparative Ex. A-1 | aqueous ammonium lactate 50% solution | 21.0 | 1.39 | 24.8 | C | D |

Vth: threshold voltage for ejection
Vop: operation voltage (voltage for actual operation)

TABLE 2

| | Type and Content of Component (c) | | Coloring Material | | Vth (v) | r value | Vop (V) | (1) Ejection Durability | (2) Amount of Kogation |
|---|---|---|---|---|---|---|---|---|---|
| Example A-4 | Diammonium succinate | 2 parts | PROJET FAST BLACK 2 | 2 parts | 20.8 | 1.39 | 24.5 | A | A |
| Example A-5 | Ammonium hydrogen aspartate | 2 parts | PROJET FAST BLACK 2 | 2 parts | 20.9 | 1.39 | 24.6 | A | A |
| Example A-6 | Diammonium malate | 2 parts | PROJET FAST BLACK 2 | 2 parts | 21.0 | 1.39 | 24.8 | A | A |
| Example A-7 | 50% Ammonium lactate soln | 2 parts | PROJET FAST YELLOW 2 | 3 parts | 21.1 | 1.39 | 24.9 | A | A |
| Example A-8 | 50% Ammonium lactate soln | 4 parts | PROJET FAST MAGENTA 2 | 3 parts | 21.0 | 1.39 | 24.8 | A | A |
| Example A-9 | 50% Ammonium lactate soln | 2 parts | PROJET FAST CYAN 2 | 4 parts | 21.0 | 1.39 | 24.8 | A | A |
| Example A-10 | 50% Ammonium lactate soln | 4 parts | PROJET FAST CYAN BLACK 2 | 2 parts | 21.1 | 1.39 | 24.9 | A | A |
| Example A-11 | 50% Ammonium lactate soln | 2 parts | CARBON BLACK | 4.5 parts | 21.0 | 1.39 | 24.8 | A | A |
| Example A-12 | 50% Ammonium lactate soln | 2 parts | CARBON BLACK (COONa) | 3 parts | 21.1 | 1.39 | 24.9 | A | A |
| Example A-13 | 50% Ammonium lactate soln | 2 parts | C.I. PIGMENT YELLOW 93 | 4 parts | 21.1 | 1.39 | 24.9 | A | A |
| Example A-14 | 50% Ammonium lactate soln | 2 parts | C.I. PIGMENT RED 122 | 4 parts | 21.9 | 1.39 | 24.6 | A | A |
| Example A-15 | 50% Ammonium lactate soln | 2 parts | C.I. PIGMENT BLUE 15:3 | 4 parts | 21.0 | 1.39 | 24.8 | A | A |
| Comp. Example A-2 | none | | PROJET FAST BLACK 2 | 2 parts | 20.7 | 1.39 | 24.4 | C | C |

TABLE 2-continued

| | Type and Content of Component (c) | | Coloring Material | | Vth (v) | r value | Vop (V) | (1) Ejection Durability | (2) Amount of Kogation |
|---|---|---|---|---|---|---|---|---|---|
| Comp. Example A-3 | none | | PROJET FAST YELLOW 2 | 3 parts | 20.7 | 1.39 | 24.4 | B | B |
| Comp. Example A-4 | none | | PROJET FAST MAGENTA 2 | 3 parts | 21.0 | 1.39 | 24.8 | C | C |
| Comp. Example A-5 | none | | PROJET FAST CYAN 2 | 4 parts | 20.9 | 1.39 | 24.6 | B | B |
| Comp. Example A-6 | none | | PROJET FAST BLACK 2 | 2 parts | 21.1 | 1.39 | 24.9 | B | B |
| Comp. Example A-7 | none | | CARBON BLACK | 4.5 parts | 21.2 | 1.39 | 25.0 | B | B |
| Comp. Example A-8 | none | | CARBON BLACK (COONa) | 3 parts | 21.0 | 1.39 | 24.8 | B | B |
| Comp. Example A-9 | none | | C.I. PIGMENT YELLOW 93 | 4 parts | 21.2 | 1.39 | 25.0 | B | B |
| Comp. Example A-10 | none | | C.I. PIGMENT RED 122 | 4 parts | 21.0 | 1.39 | 24.8 | C | C |
| Comp. Example A-11 | none | | C.I. PIGMENT BLUE 15:3 | 4 parts | 21.1 | 1.39 | 24.9 | C | C |

TABLE 3

Evaluation Results

| | Applied energy to the heater (r value) | Ink Composition | Ejection Durability | Kogation |
|---|---|---|---|---|
| Example B-1 | 1.39 | Ink of Example B-1 | A | A |
| Example B-2 | 1.10 | Ink of Example B-1 | A | A |
| Example B-3 | 1.90 | Ink of Example B-1 | A | B |
| Reference Example B-1 | 1.92 | Ink of Example B-1 | C | B |
| Reference Example B-2 | 1.96 | Ink of Example B-1 | D | C |
| Comparative Example B-1 | 1.39 | B-1 ink not containing ammonium gluconate | C | C |

TABLE 4

Main Composition of Inks of Examples B-4 to B-16

| Example | Coloring material | Ammonium aldarate |
|---|---|---|
| B-4 | PROJET FAST BLACK 2 | Ammonium glucoheptonate |
| B-5 | PROJET FAST YELLOW 2 | Ammonium gluconate |
| B-6 | PROJET FAST MAGENTA 2 | Ammonium gluconate |
| B-7 | PROJET FAST CYAN 2 | Ammonium gluconate |
| B-8 | C.I. FOOD BLACK 2 | Ammonium gluconate |
| B-9 | C.I. REACTIVE RED 180 | Ammonium gluconate |
| B-10 | C.I. DIRECT BLUE 199 | Ammonium gluconate |
| B-11 | PROJET FAST BLACK 2 | Ammonium gluconate |
| B-12 | Carbon black dispersion 1 | Ammonium gluconate |
| B-13 | Self-dispersible carbon black dispersion 2 | Ammonium gluconate |
| B-14 | C.I. Pigment Yellow 93 | Ammonium gluconate |
| B-15 | C.I. Pigment Red 122 | Ammonium gluconate |
| B-16 | C.I. Pigment Blue 15:3 | Ammonium gluconate |

TABLE 5

Evaluation Results

| | Type and Content of Component (c) | | Vth (v) | r value Eop/Eth | Vop (V) | (1) Ejection Durability | (2) Amount of Kogation |
|---|---|---|---|---|---|---|---|
| Example C-1 | Triammonium citrate | 2 parts | 20.9 | 1.39 | 24.6 | A | A |
| Example C-2 | Triammonium citrate | 2 parts | 20.9 | 1.10 | 21.9 | A | A |
| Example C-3 | Triammonium citrate | 2 parts | 20.8 | 1.61 | 26.4 | A | A |
| Comp. Example C-1 | none | | 20.9 | 1.39 | 24.6 | C | D |

TABLE 6

Evaluation Results

| | Type and Content of Component (c) | | Coloring Material | | Vth (v) | r value | Vop (V) | (1) Ejection Durability | (2) Amount of Kogation |
|---|---|---|---|---|---|---|---|---|---|
| Example C-4 | Diammonium citrate | 2 parts | PROJET FAST BLACK 2 | 2 parts | 20.8 | 1.39 | 24.5 | A | A |
| Example C-5 | Monoammonium citrate | 2 parts | PROJET FAST BLACK 2 | 2 parts | 20.9 | 1.39 | 24.6 | A | A |
| Example C-6 | Triammonium citrate | 2 parts | PROJET FAST YELLOW 2 | 3 parts | 21.3 | 1.39 | 25.1 | A | A |
| Example C-7 | Triammonium citrate | 2 parts | PROJET FAST MAGENTA 2 | 3 parts | 20.8 | 1.39 | 24.5 | A | A |
| Example C-8 | Triammonium citrate | 1 part | PROJET FAST CYAN 2 | 4 parts | 21.0 | 1.39 | 24.8 | A | A |
| Example C-9 | Triammonium citrate | 2 parts | PROJET FAST BLACK 2 | 2 parts | 20.9 | 1.39 | 24.6 | A | A |
| Example C-10 | Triammonium citrate | 1 part | CARBON BLACK | 4.5 parts | 21.0 | 1.39 | 24.8 | A | A |
| Example C-11 | Triammonium citrate | 1 part | CARBON BLACK (COONa) | 3 parts | 21.0 | 1.39 | 24.8 | A | A |
| Example C-12 | Triammonium citrate | 1 part | C.I. PIGMENT YELLOW 93 | 4 parts | 21.1 | 1.39 | 24.9 | A | A |
| Example C-13 | Triammonium citrate | 1 part | C.I. PIGMENT RED 122 | 4 parts | 21.0 | 1.39 | 24.8 | A | A |
| Example C-14 | Triammonium citrate | 1 part | C.I. PIGMENT BLUE 15:3 | 4 parts | 21.0 | 1.39 | 24.8 | A | A |
| Comp. Example C-2 | none | | PROJET FAST BLACK 2 | 2 parts | 20.7 | 1.39 | 24.4 | C | C |

What is claimed is:

1. An aqueous ink for ink-jet recording comprising:
   (a) a pigment as a coloring material;
   (b) an aqueous liquid medium; and
   (c) an ammonium salt of an acid having a methyl or methylene group and a carboxylic group.

2. The ink according to claim 1, wherein the ink comprises 0.005 to 20 percent ammonium salt based on the total weight of the ink.

3. The ink according to claim 1, wherein the acid does not substantially affect a color tone of the ink.

4. The ink according to claim 1, wherein the acid has 10 or fewer carbon atoms and 3 to 6 oxygen atoms.

5. The ink according to claim 1, wherein the acid is selected from the group consisting of malonic acid, succinic acid, glutaric acid, adipic acid, lactic acid, malic acid, aspartic acid, and glutamic acid.

6. An aqueous ink for ink-jet recording comprising:
   (a) a pigment as a coloring material;
   (b) an aqueous liquid medium; and
   (c) an ammonium aldonate.

7. The ink according to claim 6, wherein at least one of the ammonium salts is ammonium gluconate.

8. An aqueous ink for ink-jet recording comprising:
   (a) a pigment as a coloring material;
   (b) an aqueous liquid medium; and
   (c) at least one or more compounds selected from the group consisting of monoammonium citrate, diammonium citrate, and triammonium citrate.

9. The ink according to claim 8, wherein the ink comprises 0.005 to 20 percent of compound (c) based on the total amount of the ink.

10. The ink according to any one of claims 1, 6, and 8, wherein the liquid medium (b) comprises 35 to 96 percent water based on the total weight of the ink.

11. An aqueous ink for ink-jet recording, used together with an ink-jet recording head provided with a heater covered with an outermost protective layer comprising at least one of a metal and a metal oxide, the ink jet recording head discharging the ink by action of said heater, the aqueous ink comprising:
   (a) a pigment as a coloring material;
   (b) an aqueous liquid medium; and
   (c) an ammonium salt of an acid having a methyl or methylene group and a carboxylic group,
   wherein the ink removes an adherent on the surface of the ink-jet recording head when energy is applied to said heater and the ink is in contact with said heater.

12. An aqueous ink for ink-jet recording, used together with an ink jet recording head provided with a heater covered with an outermost protective layer comprising at least one of a metal and a metallic oxide, the ink jet recording head discharging an ink by action of said heater, the aqueous ink comprising:
   (a) a pigment as a coloring material;
   (b) an aqueous liquid medium; and
   (c) at least an ammonium aldonate,
   wherein the ink removes an adherent on the surface of the ink-jet recording head when energy is applied to said heater and the ink is in contact with said heater.

13. An aqueous ink for ink-jet recording, used together with ink jet recording head provided with a heater covered with an outermost protective layer comprising at least one of a metal and a metal oxide, the ink jet recording head discharging an ink by action of said heater, the aqueous ink comprising:
   (a) a pigment as a coloring material,
   (b) an aqueous liquid medium, and
   (c) at least a compound selected from the group consisting of monoammonium citrate, diammonium citrate, and triammonium citrate,
   wherein the ink removes an adherent on the surface of the ink-jet recording head when energy is applied to said heater and the ink is in contact with said heater.

14. The ink according to any one of claims 11 to 13, wherein the metal is tantalum and the metal oxide is an oxide of tantalum.

* * * * *

UNITED STATES PATENT AND TRADEMARK OFFICE
CERTIFICATE OF CORRECTION

PATENT NO. : 6,682,588 B2
DATED : January 27, 2004
INVENTOR(S) : Makoto Shioya et al.

It is certified that error appears in the above-identified patent and that said Letters Patent is hereby corrected as shown below:

Column 1,
Line 28, "induce" should read -- induces --.

Column 2,
Line 50, "Further" should read -- Further, --.

Column 4,
Lines 3 and 34, "delta position," should read -- delta-position, --.
Line 40, "acid mannonic" should read -- acid, mannonic --.

Column 10,
Line 62, "tube.," should read -- a tube. --.

Column 12,
Line 43, "A-14" should read -- A-15 --.

Column 13,
Lines 15 and 32, "2 part" should read -- 2 parts --.

Column 14,
Line 9, "25°" should read -- 25°C. --.
Line 49, "2 part" should read -- 2 parts --.

Column 15,
Line 20, "2 part" should read -- 2 parts --.
Line 49, "25°" should read -- 25°C. -- and "the ink for" should read -- an ink of --.
Line 50, "A-13." should read -- A-14-- for use in the present invention. --.
Line 57, "2 part" should read -- 2 parts --.

Column 16,
Line 33, "2 part" should read -- 2 parts --.

Column 21,
Line 17, "enough" should read -- adequately --.

Column 22,
Line 38, "28" should read -- 28% --.

Column 24,
Line 51, "Example C-15" should read -- Example C-13 --.

UNITED STATES PATENT AND TRADEMARK OFFICE
CERTIFICATE OF CORRECTION

PATENT NO. : 6,682,588 B2
DATED : January 27, 2004
INVENTOR(S) : Makoto Shioya et al.

It is certified that error appears in the above-identified patent and that said Letters Patent is hereby corrected as shown below:

Column 29,
Table 6, Example C-9, "2 part" should read -- 2 parts --.

Column 30,
Line 43, "ink jet" should read -- an ink-jet --.

Signed and Sealed this

First Day of June, 2004

JON W. DUDAS
*Acting Director of the United States Patent and Trademark Office*